United States Patent
Malvern et al.

(10) Patent No.: US 10,884,020 B2
(45) Date of Patent: Jan. 5, 2021

(54) ACCELEROMETER

(71) Applicant: Atlantic Inertial Systems Limited, Plymouth (GB)

(72) Inventors: Alan Malvern, Plymouth (GB); Louise Snell, Plymouth (GB)

(73) Assignee: ATLANTIC INERTIAL SYSTEMS, LIMITED, Plymouth (GB)

(*) Notice: Subject to any disclaimer, the term of this patent is extended or adjusted under 35 U.S.C. 154(b) by 204 days.

(21) Appl. No.: 16/056,699

(22) Filed: Aug. 7, 2018

(65) Prior Publication Data

US 2019/0041422 A1 Feb. 7, 2019

(30) Foreign Application Priority Data

Aug. 7, 2017 (GB) .................................. 1712661.6

(51) Int. Cl.
*G01P 15/125* (2006.01)
*G01P 15/13* (2006.01)
*G01P 15/08* (2006.01)

(52) U.S. Cl.
CPC .......... *G01P 15/125* (2013.01); *G01P 15/131* (2013.01); *G01P 2015/0814* (2013.01)

(58) Field of Classification Search
CPC ................. G01P 15/125; G01P 15/131; G01P 2015/0814; G01P 2015/0805; G01P 2015/0808; G01P 2015/0811
USPC ....................................... 73/514.32; 361/280
See application file for complete search history.

(56) References Cited

U.S. PATENT DOCUMENTS

| | | | |
|---|---|---|---|
| 2010/0212423 A1* | 8/2010 | Rehle | G01P 15/0802 73/504.12 |
| 2011/0049648 A1 | 3/2011 | Geisberger | |
| 2012/0262026 A1 | 10/2012 | Lin et al. | |
| 2013/0283913 A1 | 10/2013 | Lin et al. | |

(Continued)

FOREIGN PATENT DOCUMENTS

| | | |
|---|---|---|
| CN | 106597016 A | 4/2017 |
| GB | 2523320 A1 | 8/2015 |

(Continued)

OTHER PUBLICATIONS

European Search Report for Application No. 18187853.9, dated Oct. 12, 2018, 8 pages.

(Continued)

*Primary Examiner* — Robert R Raevis
(74) *Attorney, Agent, or Firm* — Cantor Colburn LLP

(57) ABSTRACT

A sensing structure for an accelerometer includes a support and a proof mass mounted thereto by flexible legs. The proof mass has moveable electrode fingers perpendicular to the sensing direction and at least four fixed capacitor electrodes, with fixed capacitor electrode fingers perpendicular to the sensing direction. The fixed capacitor electrode fingers interdigitate with the movable electrode fingers and the proof mass is mounted to the support by an anchor on a centre line of the proof mass. The proof mass has an outer frame surrounding the fixed capacitor electrodes and the flexible legs extend laterally inwardly from the proof mass to the anchor. The fixed capacitor electrodes comprise two inner electrodes, one on each side of the proof mass centre line, and two outer electrodes, one on each side of the proof mass centre line.

14 Claims, 4 Drawing Sheets

(56) References Cited

U.S. PATENT DOCUMENTS

| | | |
|---|---|---|
| 2014/0230550 A1 | 8/2014 | Simoni et al. |
| 2014/0361661 A1 | 12/2014 | Quevy et al. |
| 2016/0187371 A1 | 6/2016 | Sakai et al. |
| 2016/0377649 A1 | 12/2016 | Rytkonen |
| 2017/0074896 A1* | 3/2017 | Tanaka ................. G01P 15/125 |
| 2017/0184628 A1 | 6/2017 | Hsu et al. |

FOREIGN PATENT DOCUMENTS

| | | |
|---|---|---|
| WO | 2004076340 A1 | 9/2004 |
| WO | 2005083451 A1 | 9/2005 |
| WO | 2012076837 A1 | 6/2012 |
| WO | 2015124910 A1 | 8/2015 |

OTHER PUBLICATIONS

International Property Office Search Report for International Application No. 1712661.6 dated Jan. 9, 2018, 3 pages.

\* cited by examiner

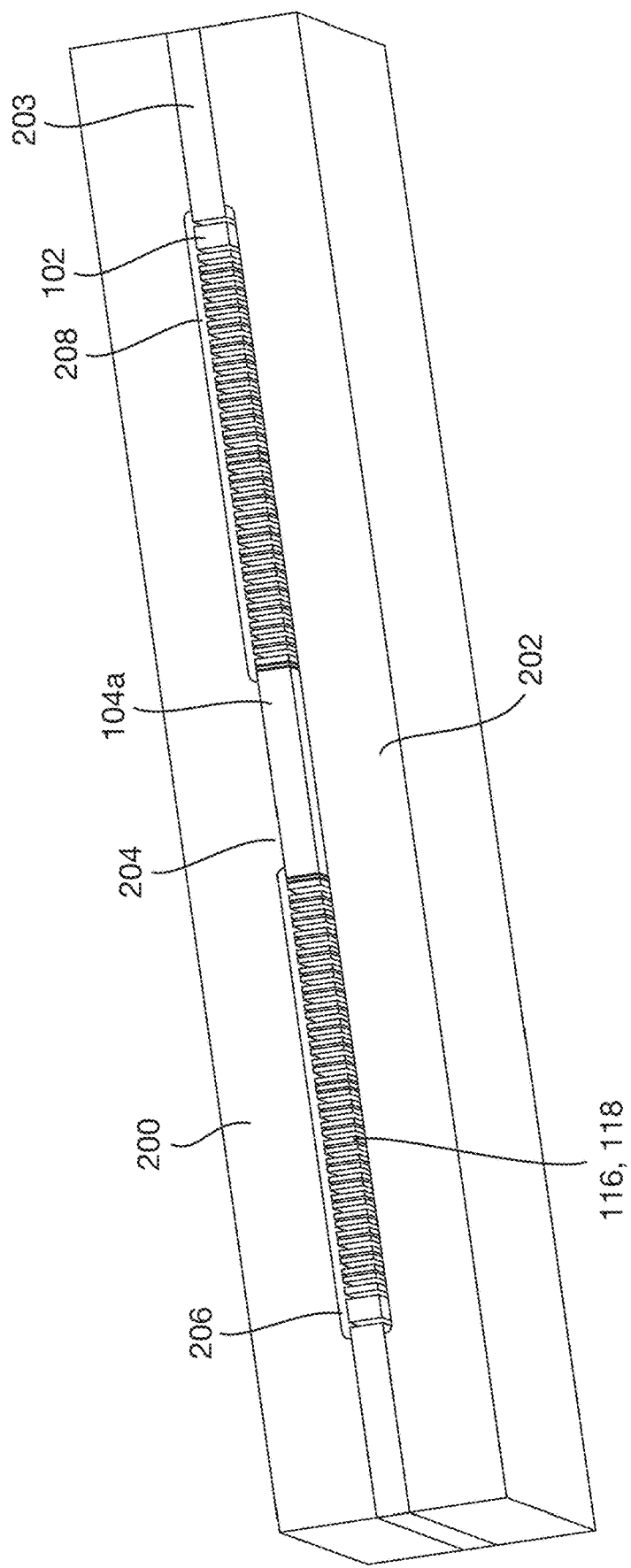

ACCELEROMETER

FOREIGN PRIORITY

This application claims priority to Great Britain Patent Application No. 1712661.6 filed Aug. 7, 2017, the entire contents of which is incorporated herein by reference.

TECHNICAL FIELD

The present disclosure relates to sensing structures for accelerometers, in particular to capacitive sensing structures for accelerometers.

BACKGROUND

Accelerometers are electromechanical devices that can measure acceleration forces due to motion and/or vibration. Accelerometers find use in a wide variety of applications, including seismic sensing, vibration sensing, inertial sensing and tilt sensing. Capacitive accelerometers are typically manufactured from silicon and implemented as micro electromechanical systems (MEMS) structures. A typical MEMS capacitive sensing structure comprises a proof mass moveably mounted relative to a support. A set of moveable electrode fingers extending from the proof mass are interdigitated with one or more sets of fixed electrode fingers, with differential capacitance between the electrode fingers being measurable so as to detect deflection of the proof mass in a sensing direction. An accelerometer comprising the sensing structure includes appropriate electronics for the drive and pickoff signals.

The proof mass is typically mounted to an anchor point on a substrate by means of flexible mounting legs which allow for movement of the proof mass in a sensing direction. The fixed capacitor fingers are also mounted to the substrate. There may be several different sets of fixed capacitive fingers, each set extending from its own electrode and each set being separately mounted to the substrate. These different sets of fingers allow for different finger arrangements (e.g. finger spacings and offsets) and different drive arrangements. However, as each electrode must be electrically isolated from the others, each requires its own mounting anchor to the substrate.

WO 2004/076340 and WO 2005/083451 provide examples of capacitive accelerometers comprising a plurality of interdigitated fixed and moveable electrode fingers extending substantially perpendicular to the sensing direction of the MEMS device. The moving and fixed electrode fingers and proof mass assembly are formed from a single silicon substrate, for example using deep reactive ion etching (DRIE). The silicon substrate is typically anodically bonded to a glass support with pre-cavitation of the glass where the elements move. After bonding and DRIE, a cap glass wafer is added to give a hermetic assembly with a gaseous medium trapped inside. The atmospheric pressure gas (typically argon) provides critical squeeze film damping for the proof mass when it moves. Down hole vias are then added to make electrical connection from the top surface of the glass support to the active silicon elements. The glass support offers high electrical insulation, but there is a mismatch in the coefficient of thermal expansion which depends on the glass type. For example, SD2 glass (alumino-silicate) gives a better thermal match than Pyrex (boro-silicate). Glass is used in preference to silicon (such as bonded silicon on oxide technology) for the support, as it reduces the stray capacitance to ground.

A prior art example of an accelerometer is described in WO 2012/076837. In this sensing structure the proof mass is split into first and second mass elements arranged on opposite sides of a pair of fixed capacitor electrodes. The mass elements may be rigidly interconnected by a brace bar to form a unitary moveable proof mass. The mass elements are mounted to the underlying support by a set of four flexible legs that connect to separate top and bottom anchor points. The anchor points and the two sets of fixed electrode fingers are anodically bonded to the underlying glass support. A problem with this design is that differential expansion between the glass support and the silicon substrate arises when there is a temperature change. In the case of uniform thermal expansion, the two fixed electrodes move symmetrically (e.g. outwards) with respect to the two proof mass anchor points, which causes a scale factor shift as the electrode finger gaps are changed. In the case of a thermal gradient across the device, the two fixed electrodes move asymmetrically with respect to each other, resulting in a bias shift. Operating in open loop, the sensitivity of such a device is typically 30 nm/g (for a 30 g range), so 30 pm of relative movement gives rise to 1 mg of bias shift. Stressing of the support glass may result from thermal expansions/gradients, or be induced by the diebond used in the device package. The diebond is usually an elastomeric material with a low Young's modulus which normally has a high coefficient of thermal expansion and may also suffer from ageing effects. Alternative die bond materials may also be used to minimize stress from the package to the MEMS.

WO2015/124910 describes an improvement on the above structure to address the problems of temperature effects. Firstly, the proof mass is anchored to the substrate by a single central anchor so that it is less likely to move significantly with respect to the fixed electrode fingers in the presence of a thermal gradient. Secondly, four sets of fixed and movable fingers are used to allow a double-differential capacitance scheme to cancel thermal gradient effects.

The MEMS sensor die is typically formed either as a Silicon-on-Glass arrangement or a Silicon-on-Silicon arrangement. In the former arrangement, the Silicon MEMS structure is sandwiched between an upper glass substrate and a lower glass substrate and is anodically bonded (or frit bonded) thereto so as to seal the MEMS structure inside the assembly. In the latter arrangement, Silicon substrates are used in place of glass substrates. The CTE of the glass can often be adjusted to be reasonably close to the CTE of the Silicon, e.g. by doping. However, there is a limit to the CTE matching that can be achieved, so differences will still be present along with the resulting stresses. As higher precisions are pursued, these residual differences become ever more important.

Existing similar MEMS accelerometers have achieved bias stability of around 1 mg (one thousandth of a g) over all environments (operational temperature, lifetime etc). This means that with all expected fluctuations in temperature, lifetime, etc., the bias is not expected to change by more than 1 mg). However it is desired to improve on this.

SUMMARY

According to this disclosure, there is provided a sensing structure for an accelerometer, comprising: a support and a proof mass mounted to the support by flexible legs for in-plane movement in response to an applied acceleration along a sensing direction; the proof mass comprising a plurality of moveable electrode fingers extending substantially perpendicular to the sensing direction and spaced apart in the sensing direction; at least four fixed capacitor electrodes, each comprising a set of fixed capacitor electrode fingers extending substantially perpendicular to the sensing direction and spaced apart in the sensing direction; each set of fixed capacitor electrode fingers being arranged to interdigitate with the movable electrode fingers; the proof mass being mounted to the support by a proof mass anchor located on a centre line of the proof mass; wherein the proof mass takes the form of an outer frame surrounding the at least four fixed capacitor electrodes, the flexible legs extending laterally inwardly from the proof mass to the proof mass anchor; wherein the at least four fixed capacitor electrodes comprises two inner fixed capacitor electrodes, one on each side of the centre line of the proof mass, and two outer fixed capacitor electrodes, one on each side of the centre line of the proof mass; wherein each of the two inner fixed capacitor electrodes comprises an anchored part anchored to the substrate and a cantilevered arm extending from the anchored part away from the centre line and having fixed capacitor electrode fingers mounted thereto; and wherein each of the two outer fixed capacitor electrodes comprises an anchored part anchored to the substrate at a location that overlaps in the sensing direction with the cantilevered arm of an inner fixed capacitor electrode and a cantilevered arm extending from the anchored part away from the centre line and having fixed capacitor electrode fingers mounted thereto.

By mounting the inner fixed capacitor electrode fingers on a cantilevered arm extending from the anchored part, the anchored part can be reduced in extent so that it does not take up the same axial extent (along the sense axis) as its fingers. This in turn allows the anchored part of the adjacent outer fixed electrode to be moved axially (along the sense axis) closer to the centre line and thus closer to the proof mass anchor. Moving the anchor points closer together reduces the effects of a thermal gradient across the sensing structure as there will be a smaller temperature difference between the extremities of the anchor points. The cantilevered arms of the inner and outer electrodes are not directly fixed to the underlying substrate like the anchor points and thus are substantially isolated from the thermal stress that those fingers would have experienced in previous designs. The mounting of fingers on a cantilevered arm on the inner electrode also makes room for the anchor point of the outer electrode to be placed alongside the cantilevered arm while still being formed from the same piece of material (typically silicon). Mounting the outer fingers on a cantilevered arm of the outer electrode also allows those fingers to be substantially isolated from thermal stresses that would previously have arisen at the outer extremities of the sensor structure. Thus by grouping the anchor points for the inner and outer electrodes together and closer to the proof mass anchor, i.e. grouping all the anchor points close to the centre of the sensor structure, the thermal effects are reduced and the variation in accelerometer bias is reduced. Thus there is an improved bias stability of the device which in turn improves the accuracy of the accelerometer output. With this improved design, the accelerometer can achieve 0.1 mg bias stability compared with the 1 mg bias stability of previous designs, i.e. a factor of ten performance improvement. This is achieved by reducing the effects of stressing of the MEMS due to longitudinal temperature gradients and due to die bond effects such as long term creep of the die bond which cause long term bias shifts and die bond ageing effects.

In previous designs the proof mass anchor has been centrally located both on the centre line half way along the sense axis and centrally on that centre line. This allows space for the flexible legs to extend outwards from the proof mass anchor to the proof mass frame. However, in preferred examples of this disclosure, the proof mass anchor comprises a first proof mass anchor and a second proof mass anchor, the first proof mass anchor and second proof mass anchor both being located on the centre line of the proof mass with a gap formed between them, and wherein each of the two inner fixed capacitor electrodes has its anchored part at least partially located within the gap.

As both the first and second proof mass anchors are still located on the centre line, the advantages in terms of thermal stress are maintained. However, creating a gap centrally between the two proof mass anchor parts allows the anchor points of the inner electrodes to be moved closer to the centre line and thus overlapping with the proof mass anchors. This further reduces the temperature differences experienced by the proof mass anchor points and the inner fixed electrode anchor points and thus reduces the thermal stresses between the movable electrodes on the frame and the fixed electrodes on the inner fixed electrodes. Further, with the outer electrode anchor overlapping with the cantilevered arm of the inner electrode, the outer electrode anchor points are also brought closer to the centre line and closer to the proof mass anchor points, again reducing the thermal stress effects and improving the bias stability of the structure.

With the proof mass anchor separated into a first and a second proof mass anchor with a gap between, the space that was previously used for the flexible legs is at least partly occupied by the proof mass anchors. Therefore preferably the flexible legs are attached to the proof mass anchor on an inner side thereof (furthest from the frame) so as to allow enough length for the flexible legs without an increase in the size of the frame. This may result in the flexible legs being located to the sides of the first and second proof mass anchors away from the centre line (preferably there are two flexible legs on each proof mass anchor, one on each side on opposite sides of the centre line).

The change to the proof mass anchor structure also raises a question as to maintaining the first and second proof mass anchors at the same electrical potential. This is desirable to ensure consistent capacitance measurements on both sides of the frame. Therefore in some examples the first proof mass anchor and the second proof mass anchor are connected together by a thin connecting structure along the centre line, thus electrically connecting the two structures together into a single structure with an I-shape (when viewed from above, perpendicular to the plane of the frame). The thin connecting structure is preferably as thin as is necessary to achieve adequate electrical connection as it reduces how close to the centre line the inner electrode anchors can be placed. In alternative examples the first proof mass anchor and the second proof mass anchor are formed as separate structures. These will still be electrically connected via the supporting legs and the frame of the proof mass, but if desired, they may be electrically connected by a separate electrical connection such as a trace between two vias, one via for each proof mass anchor. The electrical connection ensures there is only one capacitance measurement of the moving proof mass with respect to the many fixed electrodes. Where such arrangements provide adequate electrical connection between the two proof mass anchors, there is no need for the thin connecting structure and this then allows the inner electrode anchors to be brought as close to the centre line as possible without electrical contact between them.

In a typical sensor structure, each fixed electrode has electrode fingers extending perpendicular to the sensing direction in two opposite directions (i.e. extending in both directions away from a mid-line parallel to the sensing direction). This will typically require a cantilevered arm on each side of each inner electrode (i.e. one arm one side of the mid-line and one arm on the other side of the mid-line) such that the inner electrode has a C-shape with the parallel arms of the 'C' being cantilevered arms and the connecting backbone of the 'C' being the anchored part. The anchor part of the adjacent outer electrode can then be placed inside the 'C', i.e. between the two parallel cantilevered arms.

It will be appreciated that the cantilever arm(s) of the inner electrodes and the outer electrodes preferably extend parallel to the sensing direction so as to provide a mounting structure for the electrode fingers that is further along the sensing direction than the anchored part of the respective electrode. At the same time at least some of the fingers of each set of fixed capacitor electrode fingers are mounted in cantilevered manner on a cantilevered arm of either an inner fixed electrode or an outer fixed electrode. The electrode fingers extend perpendicular to the sensing direction. Thus at least some of the electrode fingers are connected to their respective electrode anchor point in a double cantilever manner by two perpendicular cantilevers.

The proof mass may be mounted to the support by any suitable number of flexible legs. In one set of examples, opposite sides of the outer frame may be connected to the proof mass anchor by a pair of flexible legs. For example, the pair of flexible legs extending from opposite sides of the proof mass anchor. However mounting the proof mass to the support by two or more separated pairs of flexible legs can improve the out-of-plane rotational stiffness. This may enable the sensing structure to provide a higher resonant frequency for the unwanted out-of-plane mode. As mentioned above, in the case that the proof mass anchor is separated into a first and a second proof mass anchor with a gap between them, the two or more separated pairs of flexible legs are preferably attached to an inner side (closest to the mid-line parallel to the sensing direction) of one of the proof mass anchors so as to allow sufficient length for the flexible legs.

In many examples of this disclosure, the proof mass and the fixed capacitor electrodes may be integrally formed from a semiconductor substrate, for example a silicon substrate. The outer frame of the proof mass (and all other features includes fixed electrodes) may be fabricated from the semiconductor substrate by an etching process such as deep reaction ion etching (DRIE). This can be done in a single stage etch. In a MEMS structure, the proof mass and the fixed capacitor electrodes may be formed in the same plane. The central anchors may be fixedly bonded, e.g. anodically bonded to the underlying electrically insulating support (for example glass).

An accelerometer comprising a sensing structure as disclosed herein may further comprise any suitable gaseous medium to provide a damping effect for the interdigitated capacitive electrode fingers. The gaseous medium may comprise one or more of air, nitrogen, argon, helium or neon. However neon may be chosen (e.g. rather than argon) to increase the damping factor by virtue of its higher viscosity. Accordingly the accelerometer may contain neon gas to provide damping for the interdigitated electrode fingers with the aim of achieving at least critical damping of the moving proof mass structure.

In any of the examples disclosed herein, the sensing structure may take the form of a MEMS, in particular a MEMS formed from a semiconductor substrate, for example a silicon substrate. The support may consist of an electrically insulating e.g. glass base that supports the semiconductor substrate. Anodic bonding may be used, as is well known in the art. Anodically bonding the semiconductor substrate to an electrically insulating e.g. glass base has the advantage of electrically isolating the capacitance of the interdigitated electrode fingers from the ground plane. Small capacitance changes are very important for the accuracy of sensing structure in a capacitive accelerometer.

The moveable and fixed electrode fingers may extend laterally i.e. sideways from the proof mass or fixed capacitor electrode, respectively, to be spaced apart in a comb-like form.

It will be appreciated that the term "moveable" is used to indicate that the fingers are able to move relative to the support, and any electrode fixed to the support, by virtue of the fact that the proof mass as a whole is moveable relative to the support due to being mounted by the flexible legs. Of course individual moveable electrode fingers are not moveable relative to the proof mass.

Other aspects of this disclosure extend to an accelerometer comprising a sensing structure as described above (optionally including any of the preferred or optional features also described above).

In some preferred examples the sensing structure comprising a first inner fixed electrode and a first outer fixed electrode on one side of the centre line and a second inner fixed electrode and a second outer fixed electrode on an opposite side of the centre line, wherein the fixed electrode fingers on the first inner electrode are arranged to interdigitate with the moveable electrode fingers with an offset in one direction from a median line therebetween and the fixed electrode fingers on the second inner electrode are arranged to interdigitate with the moveable electrode fingers with a symmetrical offset in the opposite direction from a median line therebetween; wherein the fixed electrode fingers on the first outer electrode are arranged to interdigitate with the moveable electrode fingers with an offset in one direction from a median line therebetween and the fixed electrode fingers on the second outer electrode are arranged to interdigitate with the moveable electrode fingers with a symmetrical offset in the opposite direction from a median line therebetween; and wherein the accelerometer is arranged to drive the first outer electrode in phase with the second inner electrode and is arranged to drive the first inner electrode in phase with the second outer electrode. Thus the four fixed electrodes form two sets to give a differential capacitance output on the proof mass.

For open loop operation, anti-phase square waves are used to drive the two pairs of fixed electrodes (e.g. one square wave for the first inner and second outer and the anti-phase square wave for the second inner and first outer fixed electrodes). For closed loop operation the square waves are replaced by anti-phase PWM drives. The output signal is picked up on the proof mass and a pre-amp is connected to this to sense the offset capacitance.

In examples of the present disclosure, the sensing structure may be connected to suitable drive and pickoff electronics to form an accelerometer. In the accelerometer, each pair of fixed capacitor electrodes (a pair being one inner electrode and one outer electrode on the opposite side of the centre line) may be driven in an open loop or closed loop configuration. In an open loop configuration, for example, open loop electronics are arranged to drive the first and second pairs in anti-phase. In other words the open loop electronics are preferably arranged to drive the first inner electrode and the first outer electrode in anti-phase and are arranged to drive the second inner electrode and the second outer electrode in anti-phase. The open loop electronics may apply sine wave or square wave drive signals. In open loop operation, the proof mass moves freely under acceleration and the differential change in capacitance (sensed on the proof mass as output) between an inner and an adjacent outer set of fixed electrode fingers is proportional to the deflection of the proof mass. The pickoff signal in these examples may be the demodulated voltage appearing on the output (e.g. after low pass filtering). Operation of an open loop accelerometer is described in more detail in WO 2004/076340, the contents of which are incorporated herein by reference.

In a closed loop configuration, for example, closed loop electronics are arranged to drive the pairs of fixed electrodes (a pair being an inner fixed electrode on one side and an outer fixed electrode on the opposite side of the centre line) in anti-phase using the mark (one pair) and space (other pair) of a fixed voltage PWM drive. In other words closed loop electronics are preferably arranged to drive the first inner electrode and the first outer electrode in anti-phase and are arranged to drive the second inner electrode and the second outer electrode in anti-phase. The drive electronics provide a variable electrostatic force to the electrodes to achieve force balancing to maintain the proof mass at a null position so that the PWM ratio is linearly proportional to acceleration. Under closed loop operation, ordinarily the PWM voltages form both the drive and sensing voltage. Sensing is normally done in a short period (e.g. 2 micro-seconds in one particular example) following the PWM transition for each half cycle (the sensing period being short compared with the length of the cycle which may typically be 20 micro-seconds in the example above).

In a digital approach, pulse width modulation (PWM) signals may be applied for both driving and sensing by separating the excitation and feedback signals in the frequency domain. For example, for a proof mass having a resonant frequency of around 1-3 kHz, the PWM drive signals may be at a frequency of around 50 kHz. In some examples, the closed loop electronics may apply pulse width modulation (PWM) drive signals that may have an adjustable mark: space ratio to vary the electrostatic restoring force on the proof mass. The pickoff signal in these examples is taken from the proof mass using the PWM drive signals. Operation of a closed loop accelerometer is described in more detail in WO 2005/083451, the contents of which are incorporated herein by reference.

BRIEF DESCRIPTION OF DRAWINGS

One or more non-limiting examples will now be described, by way of example only, and with reference to the accompanying figures in which:

FIG. 4 shows a cross-section through an accelerometer.

DETAILED DESCRIPTION

Figure 1:
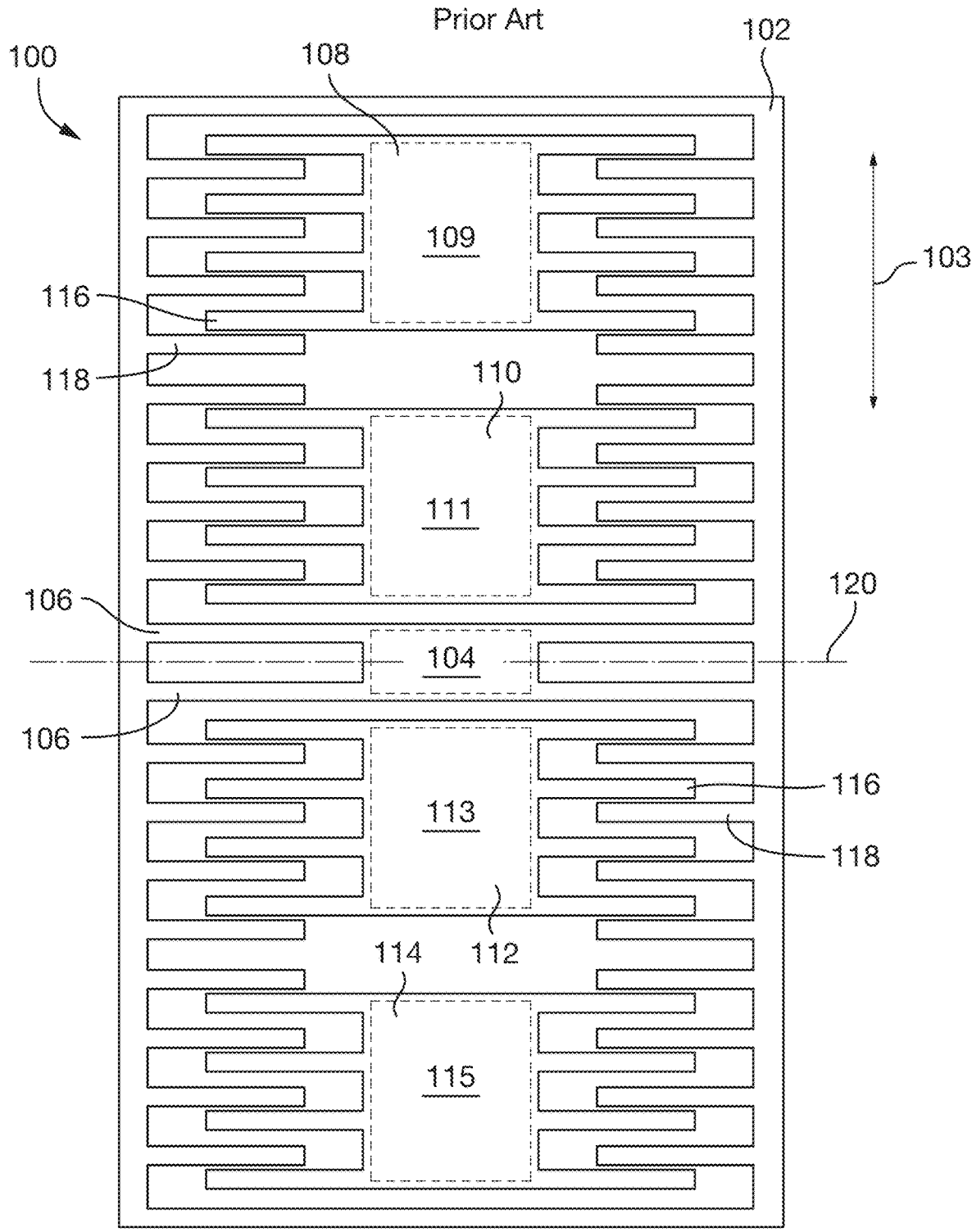
FIG. 1 shows a prior art accelerometer.

FIG. 1 shows an existing accelerometer design. The accelerometer 100 comprises a proof mass 102 in the form of a rectangular frame. The proof mass 102 is mounted to the underlying substrate through flexible legs 106 extending from a central mount 104 that is attached to the substrate (e.g. anodically bonded to it).

Also mounted to the substrate are four fixed electrodes 108, 110, 112, 114. Each fixed electrode is bonded to the substrate at a respective anchor 109, 111, 113, 115 indicated by a broken line. Each fixed electrode has fixed electrode fingers 116 extending therefrom in both directions perpendicular to the sense axis (and being symmetrical around a mid-line parallel to the sense axis). These fixed electrode fingers 116 interdigitate with moveable electrode fingers 118 formed on the proof mass 102 and extending inwardly therefrom.

Under acceleration in the sensing direction (indicated by double-headed arrow 103) the proof mass 102 moves in the sensing direction relative to the substrate and thus relative to the fixed electrode fingers 108, 110, 112, 114 causing the gaps between the interdigitated fixed and moveable capacitor fingers 116, 118 to vary.

The four fixed electrodes may be identified as a first outer fixed electrode 108, a first inner fixed electrode 110, a second inner fixed electrode 112 and a second outer fixed electrode 112. The first outer fixed electrode 108 and the first inner fixed 110 are on one side of a centre line 120 which is perpendicular to the sensing axis 103 while the second inner electrode 112 and the second outer electrode 114 are on the opposite side of the centre line 120. The accelerometer 100 is symmetrical about the centre line 120.

The fixed electrode fingers 116 and the moveable electrode fingers 118 are not interdigitated evenly, but rather are offset from a median line between adjacent fixed electrode fingers. Thus, when the proof mass 102 is not under acceleration, a moveable electrode finger 118 interdigitated between two adjacent fixed capacitor fingers 116 will be closer to one of those fixed capacitor fingers than the other. The direction of offset is different for the different fixed electrodes 108, 110, 112, 114. Thus, as seen in FIG. 1, the moveable capacitor fingers 118 are offset in one direction with respect to the fixed capacitor fingers 116 of the first outer electrode 108, but are offset in the opposite direction with respect to the fixed capacitor fingers 116 of the first inner electrode 110. As mentioned above, the accelerometer 100 is symmetrical about the centre line 120. Thus the fixed fingers 116 of the first outer electrode 108 have the same offset as those of the second inner electrode 112 and experience the same capacitance change under acceleration (thus forming a first pair of fixed electrodes). Similarly, the fixed fingers 116 of the first inner electrode 110 have the same offset as those of the second outer electrode 114 and these experience the same capacitance change under acceleration (thus forming a second pair of fixed electrodes). Under acceleration, the first pair of fixed electrodes 108, 112 will experience an opposite capacitance change compared with the second pair of fixed electrodes 110, 114 such that the capacitance of one pair increases while the capacitance of the other pair decreases and vice versa. By driving the two pairs of fixed electrode fingers with anti-phase signals, a differential capacitance signal can be sensed on the proof mass which is proportional to the displacement along the sensing axis 103 and thus provides the accelerometer output.

As can be seen in FIG. 1, the anchor points 109, 111, 113, 115 of the fixed electrodes 108, 110, 112, 114, i.e. the regions where the fixed electrodes are bonded to the underlying substrate, are spaced quite far apart along the sensing axis. Under thermal gradients, the stresses experienced by the anchor point 109 of the first outer fixed electrode 108 will be different to the stresses experienced by the anchor point 115 of the second outer fixed electrode 114. The further apart these anchor points 109, 115 are, the greater this stress difference. The difference in stress gives rise to a bias in the accelerometer output.

Figure 2:
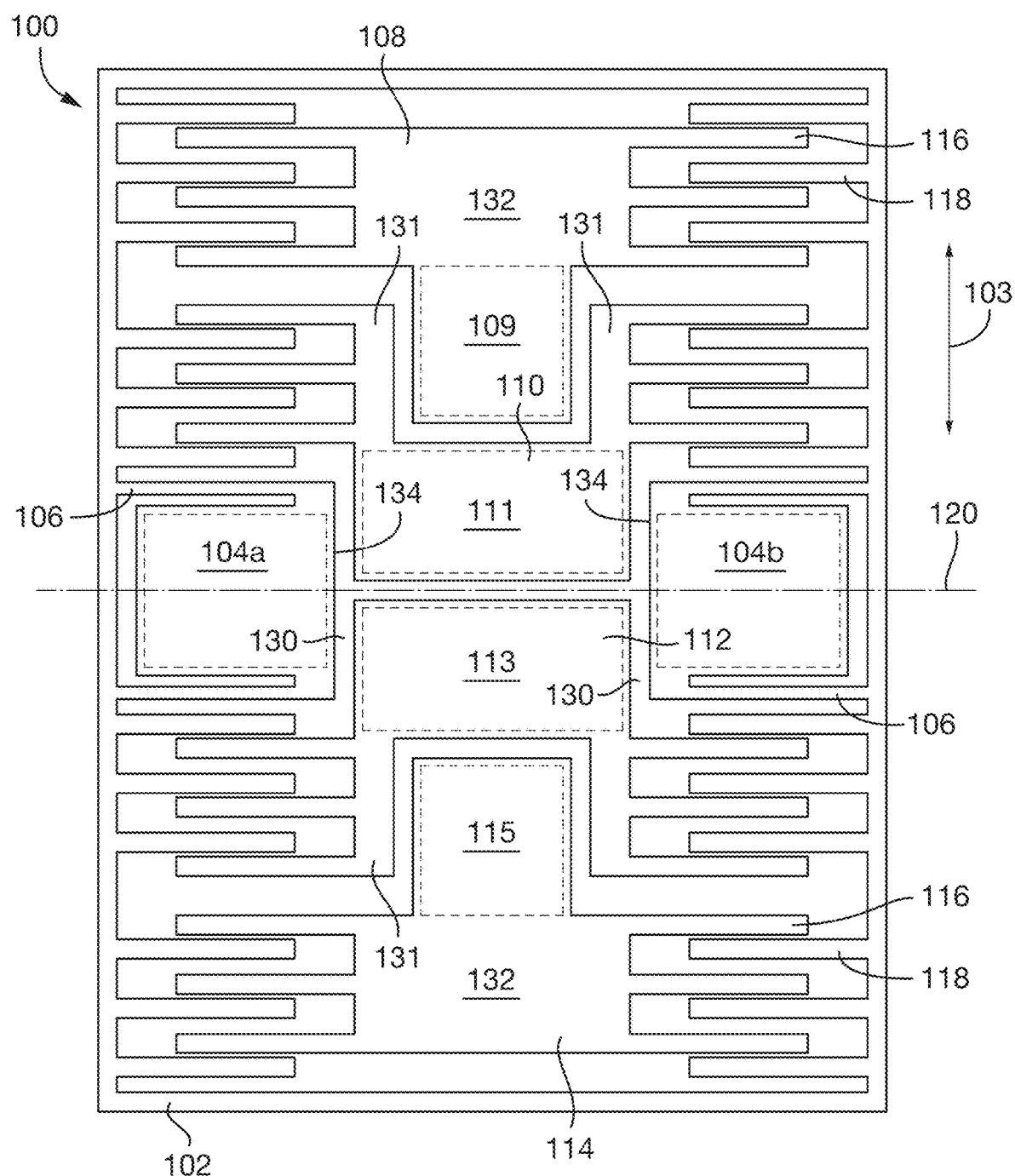
FIG. 2 shows a first example of an accelerometer with cantilevered fixed fingers.

FIG. 2 shows an improved arrangement of an accelerometer 100 in which the distance between the anchor points 109, 111, 113, 115 of the fixed electrodes 110, 112, 114, 116 has been reduced.

In order to bring the anchor pads 109, 115 of the outer fixed electrodes 108, 114 closer together (and closer to the centre line 120), the inner fixed electrodes 110, 112 have been formed in a C-shape. Taking first inner electrode 110 as an example, the anchor pad 111 forms the back of the C-shape, while the arms 131 of the C-shape extend in the sensing direction in a cantilever fashion away from the anchor pad 111. These cantilevered arms 131 are not themselves bonded to the underlying (or overlying) substrate and are only connected via the anchor pad 111. The fixed capacitor fingers 116 extend outwardly from the arms 131 as usual. It will be appreciated that the fixed electrode fingers 116 are normally (i.e. also in FIG. 1) mounted in a cantilever fashion, but in this example they are mounted in a double-cantilever fashion, i.e. the fixed electrode fingers 116 are cantilevered off the arms 131 which are themselves cantilevered off the anchor pad 111. The C-shape of the fixed electrode finger 110 provides an area between the cantilevered arms 131 in which the anchor pad 109 of the first outer fixed electrode 108 can be formed. This allows the anchor pad 109 to be moved much closer to the centre line 120 than in previous designs, i.e. much closer to the anchor pad 111 of the adjacent first inner electrode 110 and much closer to the anchor pads 104a, 104b of the proof mass 102 (discussed further below). Due to this new position of the anchor pad 109, the fixed electrode fingers 116 of the first outer fixed electrode 108 are also now mounted in a double-cantilevered fashion as each finger 116 is mounted in cantilever fashion from a region 132 of the first outer fixed electrode 108 which is not bonded to the underlying (or overlying) substrate and thus is itself mounted in cantilever fashion on the anchor pad 109.

The same arrangement is used for the second inner electrode 112 and the second outer electrode 114 which are symmetrically formed on the other side of centre line 120 and will not be described further here.

A further improvement in the positioning of the anchor pads 109, 111, 113, 115 is also achieved by separating the central anchor pad 104 into two anchor pads, namely a first anchor pad 104a and a second anchor pad 104b. Each anchor pad is bonded (e.g. anodically bonded) to the substrate. The first and second anchor pads 104a, 104b are still formed on the centre line 120, but there is now a gap 130 between them (i.e. between the inner facing surfaces of the anchor pads 104a, 104b). Forming this gap 130 between the anchor pads 104a, 104b allows the anchor pads 111, 113 to be moved into the gap 130 and thus closer to the centre line 120. This reduces the distance between the anchor pads 111, 113 which in turn reduces the distance between the anchor pads 109, 115 of the outer fixed electrodes 108, 114. While this further improvement (separating the proof mass anchor 104 to form a gap 130) is also illustrated in FIG. 2, it will be appreciated that a significant improvement may still be achieved in an example in which the proof mass anchor 104 remains as a single centrally formed anchor as shown in FIG. 1, but with the C-shaped inner electrodes 110, 112.

In the arrangement of FIG. 2, with the proof mass anchor separated into a first anchor pad 104a and a second anchor pad 104b, it can be seen that the distance between the anchor pads 104a and 104b and the proof mass frame 102 has been greatly reduced. Thus the flexible legs 106 can no longer simply extend from the outer surface of the anchor pad 104 to the frame 102 as shown in FIG. 1 as this would not provide enough flexure to allow movement of the proof mass 102 and the moveable fingers 118. Thus, as shown in FIG. 2, the flexible mounting legs 106 extend from the frame 102 to the innermost side 134 of each anchor pad 104a, 104b so that they extend as far as possible between the anchor pads 104a, 104b and the frame 102. Compared with the arrangement of FIG. 1 this requires that the flexible legs 106 extend to the sides of the anchor pads 104a, 104b, i.e. either side of the anchor pads 104a, 104b in the sensing direction, thus marginally increasing the required length of the accelerometer in the sensing direction 103. However, this increase is not problematic and the benefits of the positioning of the anchor pads 109, 111, 113, 115 of the fixed electrodes 108, 110, 112, 114 is a much more significant improvement.

Figure 3:
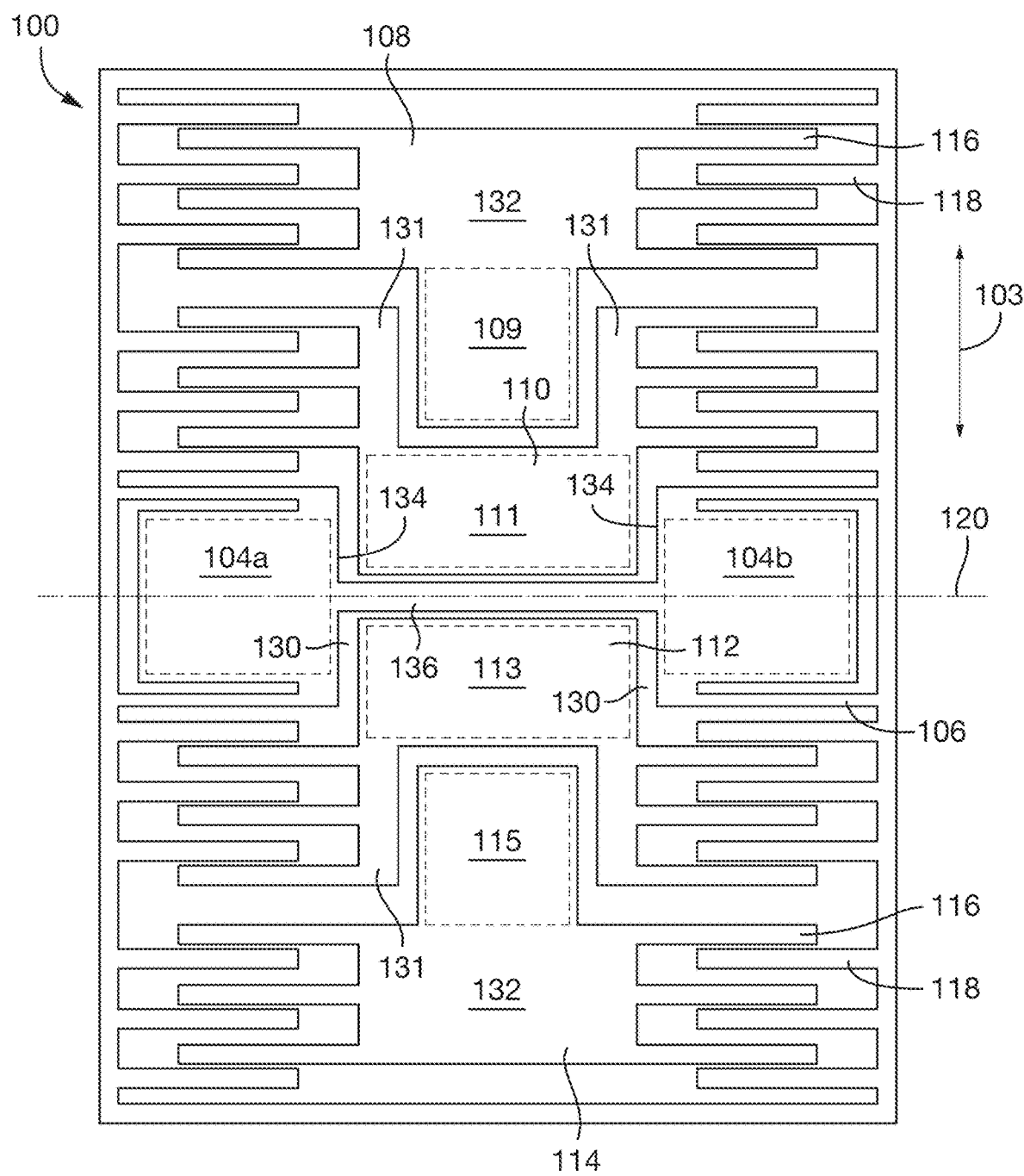
FIG. 3 shows a second example of an accelerometer with cantilevered fixed fingers.

FIG. 3 shows a variation of the arrangement of FIG. 2. The same reference numerals are used and further description thereof will be omitted. In the example of FIG. 2, the two proof mass anchor pads 104a, 104b are only electrically connected through the flexible legs 106 and the proof mass frame 102. This may provide adequate electrical connection to ensure a uniform potential across the whole proof mass structure. However, if parts of the structure such as the flexible legs 106 and the frame 102 are formed particularly thin or have defects that could cause a non-uniform voltage to appear then it may be desirable to provide an additional electrical connection between the first proof mass anchor pad 104a and the second proof mass anchor pad 104b. This can be achieved by providing a separate electrical connection external to the sensor structure, e.g. by forming two vias, one for each anchor pad 104a, 104b and providing an external electrical connection therebetween. However, FIG. 3 shows an alternative solution in which an electrical connection between the first proof mass anchor pad 104a and the second proof mass anchor pad 104b is maintained through a thin beam 136 connecting them along the centre line 120. This thin beam 136 hinders the ideal placement of the two inner fixed electrode anchor pads 111, 113 as close to each other as possible as they must now lie either side of the thin beam 136 (and electrically separated therefrom). However, as the thickness of the beam 136 does not need to be much to achieve the electrical connection between the proof mass anchor pads 104a, 104b, the fixed electrode anchor pads 111, 113 can still be positioned very close together, with the significant benefits associated with such placement.

Thus, by arranging the fixed electrode anchor pads 109, 111, 113, 115 closer to each other, closer to the proof mass anchor pads 104a, 104b in the sensing direction and closer to the centre line 120, stresses which are transmitted through the anchor pads 104a, 104b, 109, 111, 113, 115 (such as those arising from thermal gradients) are reduced. The effect of this is that the bias arising from such stresses is reduced and the overall bias stability of the accelerometer 100 is improved. As mentioned above, it has been found that in some examples an improvement in bias stability by a factor of 10 can be achieved, thus achieving a bias stability of 0.1 mg or better.

FIG. 4 shows a cross-section taken through an accelerometer 100 of similar design to that of FIG. 2 or FIG. 3 along the sensing axis and through one of the proof mass anchor pads 104a. The structure of the accelerometer 100 can be seen, including a first substrate 200, a second substrate 202 (typically of glass) and a silicon layer 203 sandwiched between the first substrate 200 and the second substrate 202. The anchor 104a of the proof mass frame 102 is attached (typically by anodic bonding) to the first substrate 200 at a projection 204 which is formed by forming a cavity 206 in the first substrate 200. A cavity 208 is also formed in the second substrate 202, these cavities 206, 208 allowing free movement of the fixed and movable fingers 116, 118.

The invention claimed is:

1. A sensing structure for an accelerometer, comprising:
a support and a proof mass mounted to the support by flexible legs for in-plane movement in response to an applied acceleration along a sensing direction;
the proof mass comprising a plurality of moveable electrode fingers extending substantially perpendicular to the sensing direction and spaced apart in the sensing direction;
at least four fixed capacitor electrodes, each comprising a set of fixed capacitor electrode fingers extending substantially perpendicular to the sensing direction and spaced apart in the sensing direction;
each set of fixed capacitor electrode fingers being arranged to interdigitate with the movable electrode fingers;
the proof mass being mounted to the support by at least one proof mass anchor located on a centre line of the at least one proof mass;
wherein the proof mass takes the form of an outer frame surrounding the at least four fixed capacitor electrodes, the flexible legs extending laterally inwardly from the proof mass to the proof mass anchor;
wherein the at least four fixed capacitor electrodes comprises two inner fixed capacitor electrodes, one on each side of the centre line of the proof mass, and two outer fixed capacitor electrodes, one on each side of the centre line of the proof mass;
wherein each of the two inner fixed capacitor electrodes comprises an anchored part anchored to the substrate and a cantilevered arm extending from the anchored part away from the centre line and having fixed capacitor electrode fingers mounted thereto; and
wherein each of the two outer fixed capacitor electrodes comprises an anchored part anchored to the substrate at a location that overlaps in the sensing direction with the cantilevered arm of an inner fixed capacitor electrode and a cantilevered arm extending from the anchored part away from the centre line and having fixed capacitor electrode fingers mounted thereto.

2. A sensing structure as claimed in claim 1, wherein the at least one proof mass anchor comprises a first proof mass anchor and a second proof mass anchor, the first proof mass anchor and second proof mass anchor both being located on the centre line of the proof mass with a gap formed between them, and wherein each of the two inner fixed capacitor electrodes has its anchored part at least partially located within the gap.

3. A sensing structure as claimed in claim 2, wherein the first proof mass anchor and the second proof mass anchor are connected together by a thin connecting structure along the centre line.

4. A sensing structure as claimed in claim 2, wherein the first proof mass anchor and the second proof mass anchor are formed as separate structures and are electrically connected by a separate electrical connection.

5. A sensing structure as claimed in claim 2, wherein the flexible legs are attached to the first proof mass anchor and the second proof mass anchor at inner sides thereof.

6. A sensing structure as claimed in claim 1, wherein each set of fixed capacitor electrode fingers is mounted in cantilevered manner on a cantilevered arm of either an inner fixed electrode or an outer fixed electrode.

7. A sensing structure as claimed in claim 1, wherein each inner fixed capacitor electrode is formed as a C-shape comprising two substantially parallel cantilevered arms extending away from an anchored part.

8. A sensing structure according to claim 1, wherein the at least one proof mass is connected to the proof mass anchor by two or more separated pairs of flexible legs.

9. A sensing structure according to claim 1, wherein the sensing structure is a MEMS.

10. A sensing structure according to claim 1, wherein the support is made of glass.

11. An accelerometer comprising:
a sensing structure according to claim 1.

12. An accelerometer according to claim 11, the sensing structure comprising a first inner fixed electrode and a first outer fixed electrode on one side of the centre line and a second inner fixed electrode and a second outer fixed electrode on an opposite side of the centre line,
wherein the fixed electrode fingers on the first inner electrode are arranged to interdigitate with the moveable electrode fingers with an offset in one direction from a median line therebetween and the fixed electrode fingers on the second inner electrode are arranged to interdigitate with the moveable electrode fingers with a symmetrical offset in the opposite direction from a median line therebetween;
wherein the fixed electrode fingers on the first outer electrode are arranged to interdigitate with the moveable electrode fingers with an offset in one direction from a median line therebetween and the fixed electrode fingers on the second outer electrode are arranged to interdigitate with the moveable electrode fingers with a symmetrical offset in the opposite direction from a median line therebetween; and
wherein the accelerometer is arranged to drive the first outer electrode in phase with the second inner electrode and is arranged to drive the first inner electrode in phase with the second outer electrode.

13. An accelerometer according to claim 11, wherein open loop electronics are arranged to drive the first inner electrode and the first outer electrode in anti-phase and are arranged to drive the second inner electrode and the second outer electrode in anti-phase.

14. An accelerometer according to claim 11, wherein closed loop electronics are arranged to drive the first inner electrode and the first outer electrode in anti-phase and are arranged to drive the second inner electrode and the second outer electrode in anti-phase.

* * * * *